United States Patent [19]
Hudson

[11] 4,099,365
[45] Jul. 11, 1978

[54] HARVESTING OF SUGAR CANE

[75] Inventor: John Colin Hudson, St. Thomas, Barbados

[73] Assignee: F.W. McConnel Limited, Ludlow, England

[21] Appl. No.: 732,399

[22] Filed: Oct. 14, 1976

Related U.S. Application Data

[63] Continuation-in-part of Ser. No. 498,921, Aug. 20, 1974, abandoned.

[51] Int. Cl.² ............................................ A01D 45/10
[52] U.S. Cl. ..................................... 56/13.5; 56/16.6
[58] Field of Search ...................... 56/1, 13.5, 14.3, 51, 56/56–59, 28, 503, 192, 63, 364, 16.4, 16.5, 16.6

[56] References Cited
U.S. PATENT DOCUMENTS

| | | | |
|---|---|---|---|
| 2,716,322 | 8/1955 | Pool et al. | 56/157 |
| 2,949,717 | 9/1960 | Johannesen | 56/14.3 |
| 3,673,774 | 7/1972 | Mizzi | 56/13.9 |
| 3,863,431 | 2/1975 | Fowler | 56/202 |

*Primary Examiner*—Russell R. Kinsey
*Attorney, Agent, or Firm*—Watson, Cole, Grindle & Watson

[57] ABSTRACT

A method and apparatus for cleaning and topping a swath of at least partially cut flattened leafy green sugar cane wherein the apparatus, towed behind a propelling vehicle, is passed over the swath of cane for successively performing the steps of gathering the swath, lifting it from the bround on which it lies, pulling the individual canes top first from the swath, supporting the stalk of each cane as it is pulled from the swath, accelerating the cane rearwardly of the direction of travel of the vehicle, and restraining the top of each cane while continuing to move the stalk rearwardly to cause the top to break away from the stalk.

29 Claims, 9 Drawing Figures

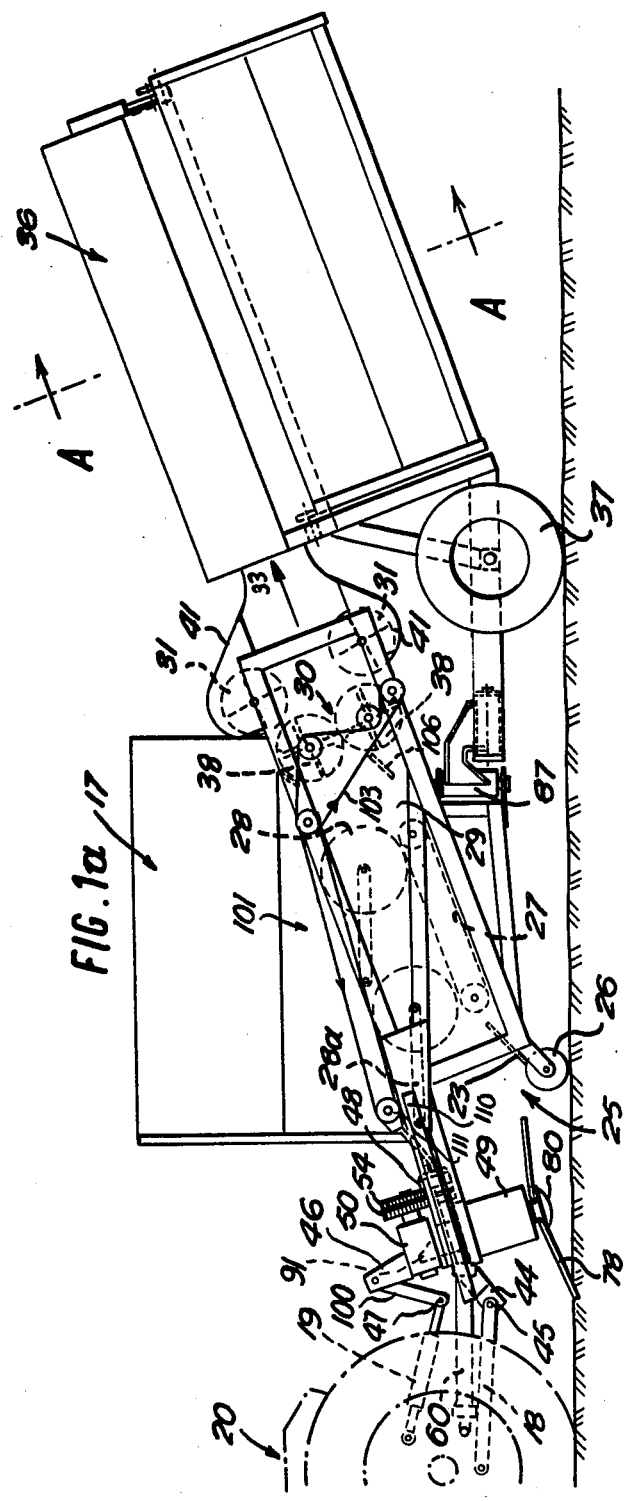

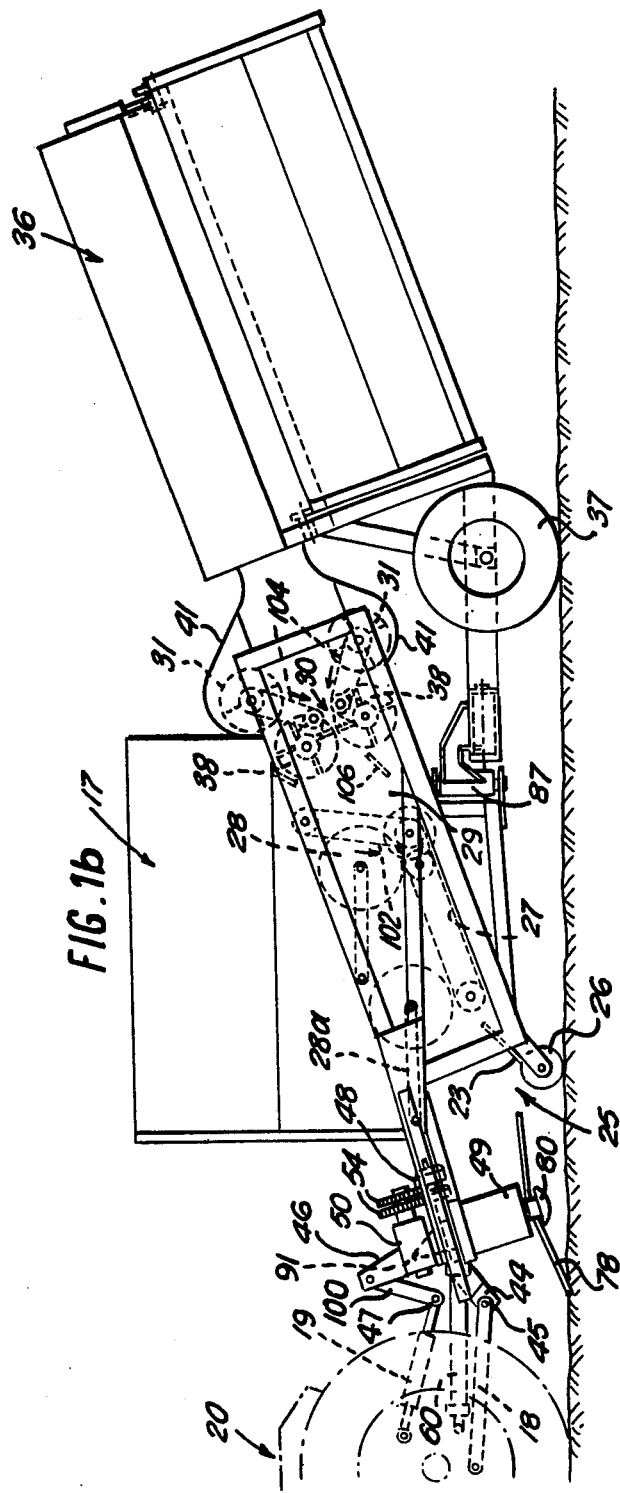

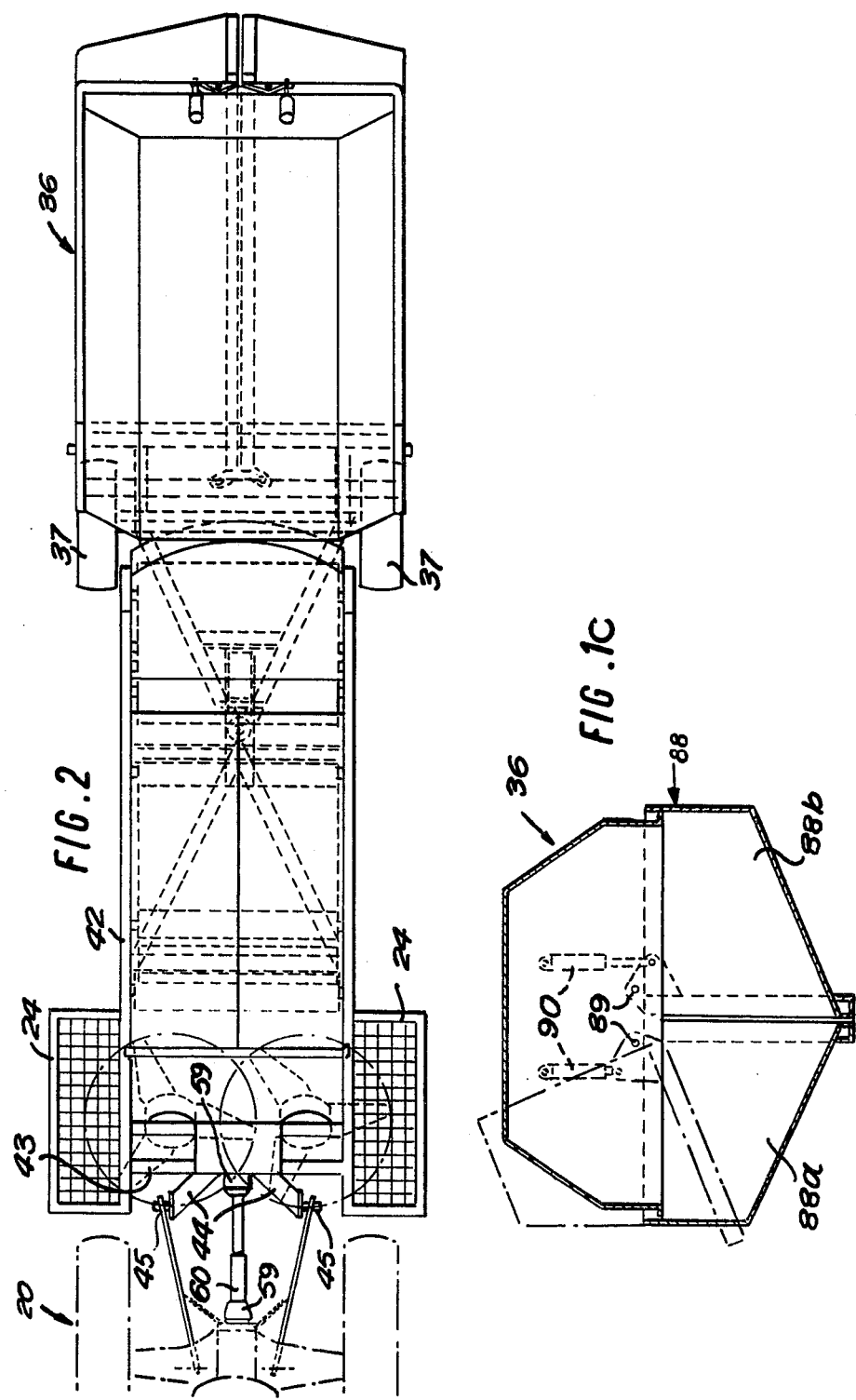

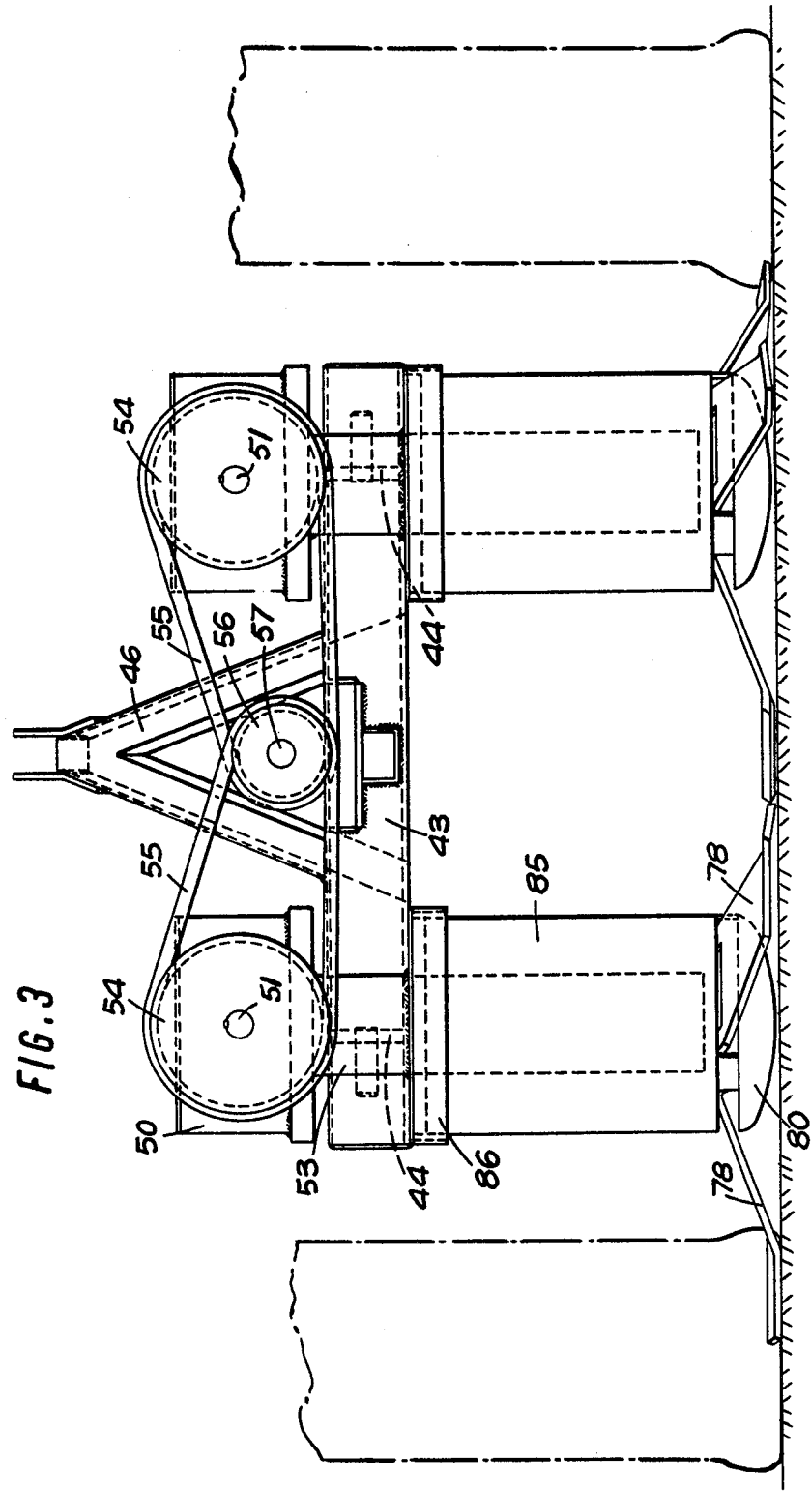

HARVESTING OF SUGAR CANE

RELATED APPLICATION

This application is a continuation-in-part of U.S. Ser. No. 498,921, filed Aug. 20, 1974, and now abandoned.

FIELD OF THE INVENTION

The invention relates to the harvesting of sugar cane.

DESCRIPTION OF THE PRIOR ART

Sugar cane is usually grown on ground comprising alternate ridges and furrows and having generally a very uneven contour. By the time the cane is ready for harvesting, the base of the crop has often become surrounded by stones, rubble, leafy trash and other obstructions, and the cane itself may have become extremely tangled with the cane stalks extending in all directions and at all angles to the ground. The crop grows to several feet in height, and the stalk is not only extremely thick but is also clad with heavy leaves and a leafy bushy top.

The complete harvesting of sugar cane involves first cutting the crop at (or near) ground level, and then stripping the leaves and the top to clean all unnecessary foilage from the sugar-containing stalk. British Pat. No. 1,427,930, commonly owned herewith, describes and claims a machine which will remove the tops of growing sugar cane, and British Pat. No. 1,424,511, commonly owned herewith describes and claims a machine which severs the growing cane stalks at their weak base points and lays them out in a flattened swath on the ground. However, known forms of rotary crop-cutting machine (such as that shown in U.S. Pat. No. 3,673,779 issued July 4th 1972, to Scarnato et al) would be completely unsuitable for gathering the cut cane crop — the high-speed sharpened blades of such machines would rapidly become blunted in ploughing through the trash and rubbish surrounding the crop, the blades would be totally unable to follow the uneven contours of the ground to pick up the crop, and the machine has no means whatever for cleaning the crop and presenting it in a form suitable for delivery into a following transport vehicle.

It is therefore, not surprising that sugar cane has traditionally been harvested by hand.

SUMMARY OF THE INVENTION

According to one aspect of the invention there is provided a method of cleaning a swath of at least partially cut flattened sugar cane, comprising passing over the swath of cane an apparatus, mounted on or towed behind a propelling vehicle, which performs the successive steps of gathering the swath, lifting it from the ground on which it lies, pulling canes individually from the swath and accelerating them rearwardly of the direction of travel of the vehicle.

Thus, leafy material is stripped from the canes as they are pulled from the swath and falls, together with trash and leaves broken during the flattening process, to the ground as the canes are accelerated rearwardly.

In the case where the swath of cane comprises leafy green unburnt sugar cane, the swath is preferably approached tops first by the apparatus.

In this case, the tops may be removed from the cane stalks after being gathered by the apparatus.

The invention therefore further provides a method of cleaning and topping a swath of at least partially cut and flattened leafy green sugar cane, comprising passing over the swath of cane an apparatus, mounted on or towed behind a propelling vehicle which performs the successive steps of gathering the swath, lifting it from the ground on which it lies, pulling individual canes top first from the swath, supporting the stalk of each cane as it is pulled from the swath, accelerating the cane rearwardly of the direction of travel of the vehicle, restraining the top of each cane whilst continuing to move the stalk rearwardly to cause the top to break away from the stalk.

Apparatus for cleaning and topping a swath of at least partially cut and flattened leafy green sugar cane, comprises a frame, means for mounting the frame on a propelling vehicle to be passed over the swath, one or more power-driven hub assemblies mounted on the frame and rotatable about an axis extending upwardly from the ground along which the vehicle travels, a number of gathering elements mounted on and extending outwardly from the lower portion of the or each hub assembly for lifting the swath from the ground on which it lies and moving the lifted cane rearwardly, means pivotally connecting the gathering elements to the hub assembly along axes which permit each element to swing up and down relative to the hub assembly to follow the contours along which the vehicle travels, means defining a nip, for pulling individual canes top first from the swath, said nip defining means being mounted on the frame rearwardly of the gathering elements, in the direction of travel of the swath, and including means for restraining the leafy top of each cane whilst the stalk is pulled through the nip by the nip defining means to cause the top to break away from the stalk, means for generating a forced air draught in a sense to force the leaves of the stalk top against the nip defining means to further restrain the leafy top, said forced air draught generating means being mounted on the frame.

BRIEF DESCRIPTION OF THE DRAWINGS

One embodiment of the invention will now be described by way of example only and with reference to the accompanying drawings in which:

FIG. 1a shows in side elevation an apparatus embodying the invention and showing part of a drive system;

FIG. 1b shows in side elevation the apparatus of FIG. 1a with a further part of the drive system shown in broken lines;

FIG. 1c is a section on the line A—A in FIG. 1a;

FIG. 2 shows the apparatus of FIG. 1 in plan, with the transmission casings partly omitted;

FIG. 3 shows an end view of the gathering apparatus with the safety screen removed;

DESCRIPTION OF THE PREFERRED EMBODIMENT

Figure 4:
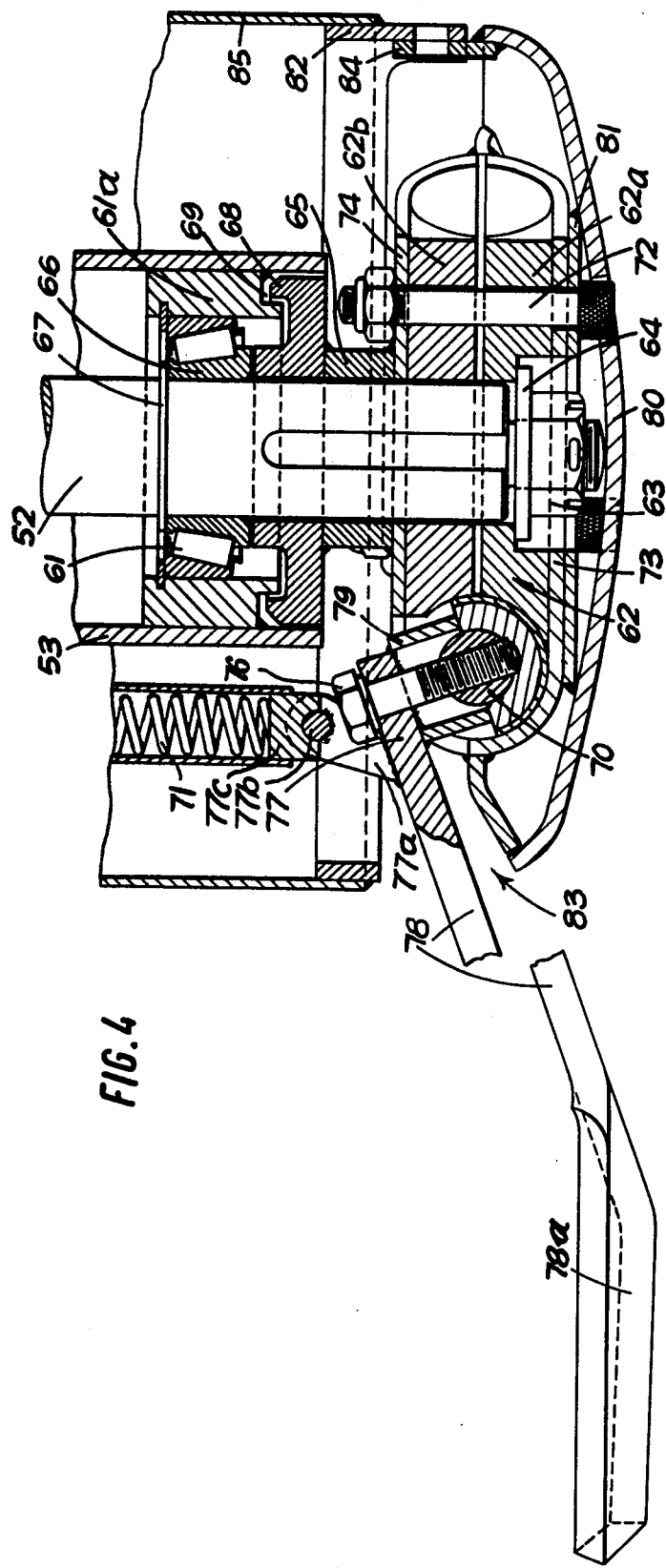
FIG. 4 shows a partial section on an enlarged scale, of a drum of the gathering apparatus.

The apparatus is coupled to the conventional three-point linkage of a tractor 20 (shown only partly, in, phantom line, in FIGS. 1a, 1b and 2), by a cross-beam 43 having two spaced forwardly extending brackets 44 which are pivotally connected at 45 to the lower draft links 18 of the tractor. A further inverted V-shaped bracket 46 extends upwardly from the cross-beam 43 and is pivotally connected at 47 to the central top link 19 by intermediate link 100 of the tractor. The tractor carries a hydraulic pump, fed from twin hydraulic reservoirs (not shown) and driving various parts of the apparatus to be indicated later.

The cross-beam 43 supports two gathering drums 49, which are symmetrically disposed one on either side of the central longitudinal axis of the tractor and are tilted upwardly of the direction of travel and the apparatus by an angle of between 10 and 20° to the vertical. The two drums 49 are substantially identical and only one will be described in detail.

Each drum is journalled, at its upper part, in a transmission casing 50 having bearings in which is rotatable a horizontal shaft 51. A bevel gear transmission, not shown, coupled to the shaft 51 with a vertical shaft 52 (see FIG. 4) which extends down through a further casing 53 and to which gathering sweeps are pivotally connected in a manner which will be described later.

The shaft 51 has mounted on the rear end thereof a pulley 54. An endless drive belt 55 encircles the pulley 54 and another pulley 56 is driven through an overload clutch 48 mounted on a shaft 57 which is rotatable in bearings mounted on the beam 43. The end of this shaft 57 remote from the pulley 56 is connected through universal couplings 59 with the power take-off shaft 60 of the tractor. As best seen in FIG. 1 the pulley 54 of the two transmission assemblies and the pulleys 56 are staggered fore-and-aft. The power take-off thus transmits a drive through the endless belt transmission to the two vertical shafts 52.

As best seen in FIG. 4 the lower end of each shaft 52 is rotatable in bearings 61 within the lower end of the tube 53. A hub 62 is keyed onto the lower end of the shaft 52 being clamped by a clamping nut 63 between a washer 64 and a spacer 65 which engages the inner race 66 of the bearing 61. The race 66 of the bearing is retained on the shaft 52 by a spring clip 67.

The spacer 65 includes an upstanding flange 68 which rotates within a recess 69 in an annular ring 61a which surrounds the bearing 61 within the tube 53. The flange 68 thus protects the bearing 61 and prevents foreign matter finding its way up onto the bearing.

The hub 62 has pivotally mounted within it three equally spaced horizontal and tangential shafts 70. A respective spring 71 acts indirectly on each shaft 70 so that pivotal movement of the shaft in a clockwise direction takes place against the action of the spring 71: the upper end of the spring (not shown) engages one of several spaced abutments on the drum 85, and selection of the appropriate abutment allows the spring loading to be varied. The hub is formed in two parts 62a and 62b which are clamped together by bolts 72, the two parts 62a and 62b being enclosed between the two parts 73 and 74 of a two part metal casing. The upper part 74 of the casing is welded to the spacer 65.

The opposite ends of each shaft 70 project into a cut-away portion of the hub, and secured to the ends of each shaft by screws 76 are the limbs 77 of the forked end of a gathering sweep 78. A shaped member 79 welded to each limb of the sweep partially embraces each end of the shaft.

Each sweep 78 extends outwardly and downwardly away from its associated shaft 70 and is formed at its outer extremity with an inclined gathering portion 78a.

Each sweep 78 carries a pair of spaced upstanding lugs one of which being indicated at 77a, which together support a peg 77b parallel to shaft 70. The peg 77b engages a shaped block 77c against the upper surface of which the lower end of spring 71 abuts. Each sweep 78 is urged downwardly by the action of spring 71.

The lowermost part of each gathering drum comprises a domed cap 80 which is welded to a plate 81 which is clamped to the hub 62 by the aforementioned bolts 72. Disposed above the cap 80 is a ring 82 of equal diameter. The ring 82 and cap 80 are cut-away to provide apertures, as at 83 through which the sweeps 78 project and which are of sufficient size to permit up-and-down pivoting movement of the sweeps on the shafts 70. The ring 82 and cover 80 are secured together between the sweeps 78 by welded spacing pieces 84.

The ring 82 has welded to it the lower end of a drum 85 which encircles the tube 53. The upper end of the drum 85 is located by three ball races (not shown) triangularly disposed and riding inside a ring 86 (see FIG. 3) carried by the cross-beam 43.

Figure 5:
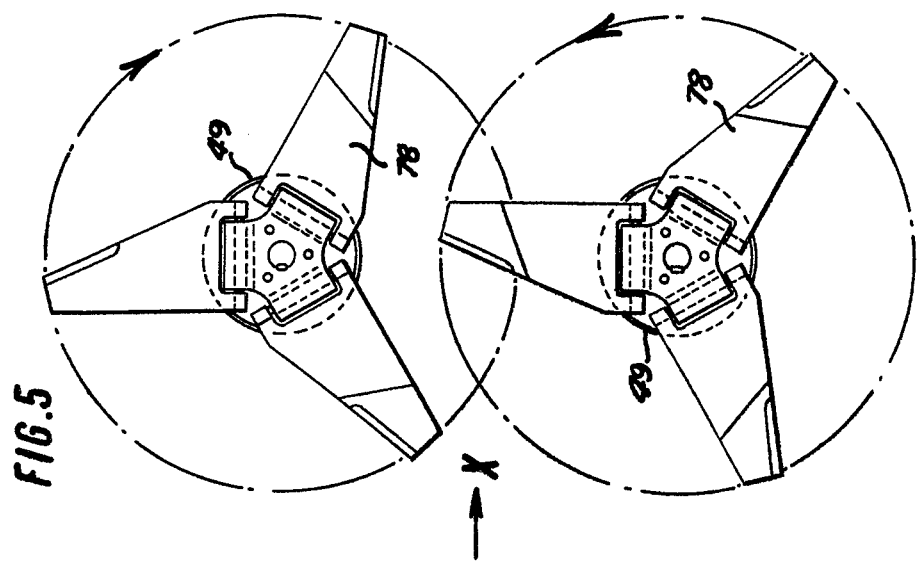
FIG. 5 shows diagrammatically the gathering elements of the gathering apparatus.

The sweeps of the two gathering drums are oppositely handed and the transmission to the drums causes them to contra-rotate in synchronism. As best seen in FIG. 5 the sweeps rotate in the direction indicated by the arrows when the apparatus is moving in the direction of the arrow X.

Since the sweeps 78 are capable of flexing up-and-down resiliently relatively to the rotating drum it is possible for them to follow the contours of uneven ground without digging into the ground or riding over any cane stalks. This is an extremely important feature of the apparatus since, as has already been mentioned, sugar cane is normally grown on ground formed into ridges and furrows.

During operation of the drums the links at the rear of the tractor are put in their "floating" condition so that the weight of the gathering assemblies is taken by a ground-following roller 26 and the sweeps 78 are free follow the contours of the ground. Counterbalancing springs (not shown) may be provided to take some of the weight of the gathering assemblies in this "floating" condition, and thus relieve some of the load on the ground-following roller 26.

Should the front end of the apparatus rear up during use, the pivot 47 will automatically move to the right (in FIG. 1) until it hits a stop pad 91 on the main frame 42; thus further upward movement is prevented and the apparatus tends automatically to right itself.

In an alternative construction the springs 71 are replaced or assisted by other forms of resilient restraint acting to resist upward pivoting movement of the sweeps. For example each sweep may be biassed downwardly by a rubber bush connected between each sweep and its associated shaft. In this case the bushes are shaped as and replace the bearings which receive the shafts 70. In a preferred arrangement the shafts and bushes are in threaded engagement since in such an arrangement the threads will absorb the axial loads on the bearings.

To elevate and clean a swath of at least partially flattened sugar cane, the apparatus follows an apparatus of the kind described and claimed in British Pat. No. 1,424,511 which has flattened the cane into a swath and severed the stalks of flattened cane approximately at ground level by breaking the stalks at their weak base points. The apparatus of the present invention is passed over the swath of flattened cane in a direction opposite to that in which the flattening and severing apparatus has passed. The swath of cane is approached tops-first, lifted from the ground by the contra-rotating sweeps, guided between the drums and, the canes are then accelerated tops first across a gap 25 and up an inclined elevating plate or ramp 23 by a belt conveyor 27, which is driven from shaft 57 by drive 101 (see FIG. 1a) and drive 102 (see FIG. 1b). The plate 23 and belt conveyor 27 are mounted on the main frame 42 of the apparatus.

The conveyor 27 accelerates the cane from the trashy swath and across gap 25 leaving trash unsupported by cane toward the bottom of the swath. This trash therefore collapses into the gap being swept back as it falls down and eventually is trapped beneath a full width ground following roller 26 so that it cannot be swept up plate 23 by canes being pulled onto conveyor 27. It will be appreciated that the stalks of cane as they are accelerated will have their leaves broken back against their direction of growth, and will be stripped off the stalk. Thus, leafy material is stripped from the canes as they are pulled from the swath and falls, together with trash and leaves broken during the flattening process, to the ground as the canes are accelerated rearwardly.

When the canes are short, the initial gathering and lifting is aided by lightly pressing down the swath in front of the gathering sweeps by a resilient sheet (not shown).

The roller 26 may be freely rotatable or power driven.

As the stalks are elevated, freely rotatable rollers 28 on pivoted swinging arms 28a which are in turn pivotably connected to the main frame 42 press the elevated material against the elevating conveyor 27.

Figure 6:
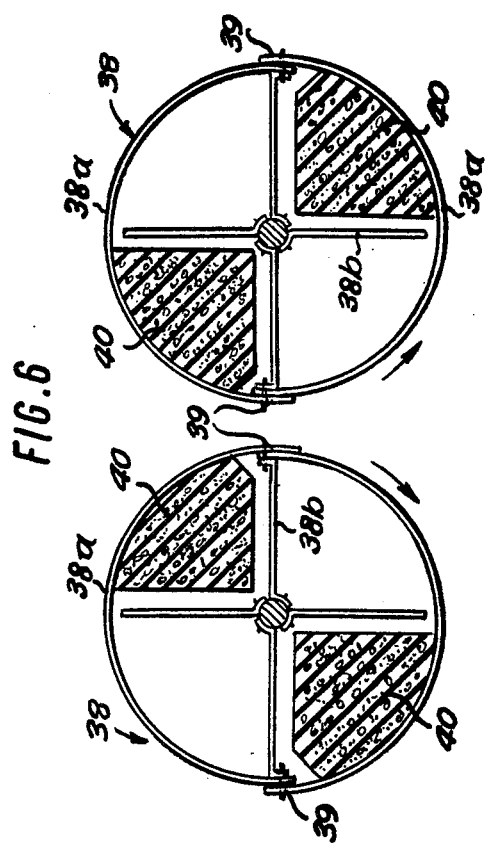
FIG. 6 shows diagrammatically the nip elements of the apparatus.

The second gap 29 is of sufficient width for any remaining leafy material and trash to fall downwards onto the ground, whilst being sufficiently short in width to allow all but the very shortest lengths of cane stalk to travel across it and up a ramp 106 and enter a nip indicated generally at 30. The nip 30 is defined by two contra-rotating elements 38, driven from shaft 57, via drive 110 and gear box 111, by drives 101 and 103 (see FIG. 1a), and FIG. 6 shows these elements in greater detail in end elevation. The elements 38 are of four-fingered design, and two strips of flexible belting 38a are secured in the manner shown to each four-fingered paddle 38b with an overlap at 39, and polyurethane foam 40 is adhered to its respective strips of belting 38a and is packed between two opposed quadrants of each cylindrical drum so formed. The elements are so synchronised that portions 39 form the nip, and it will be appreciated that this particular form of drum deals effectively with rocks, stones and similar obstructions which may be elevated with the swath, by allowing each drum to assume non-circular profiles during operation and hence allowing the creation of a nip of varying size.

The elements are so synchronised that respective portions 39 of the two elements approach one another to grip the cane stalks of the elevated swath individually and accelerate them rearwardly through the nip. It will be appreciated that this rearward pulling of individual cane stalks from the swath increases the stripping and cleaning effect. The cleaned cane stalks pass through the nip and the leafy material and trash which cannot be accelerated like the cane, drops through the gap 29.

Figure 7:
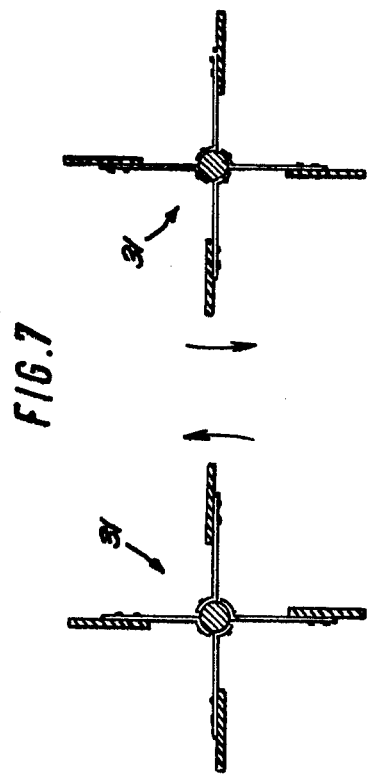
FIG. 7 shows diagrammatically the fans of the apparatus.

As the cane stalks come through the nip 30, spaced contro-rotating paddle fans 31, which are rotatably mounted on the main frame 42 by means (not shown) and which are driven from shaft 57 by drives 101 and 102 (see FIG. 1a) and respective drives 104 (see FIG. 1b), create air draughts in directions against and at an angle to the direction of travel 33 of the stalks. FIG. 7 shows these fans in end elevation; the extremeties of each four-fingered paddle are overlaid with flexible rubber flaps, and the fans are driven.

As the cane stalks enter the nip 30 the outer flexible leaves (such as, for example the leaves growing from the weak point at the base of the cape top) are frictionally engaged by the surface of the drums 38 and hence tend to curl around the drums as the cane stalks come through the nip. The air currents from the fans confirm the leaf wrap around the drums. The outer leaves of the top, of each cane, and hence the top are restrained whilst the drums 38 continue to drive the respective stalk through the nip causing the top to break off at its weak point as the cane emerges from the nip. The rubber paddles 38b act as moving edges against which the top can break off. Those tops, which are on the top of the canes, may be thrown into an optional collecting cage 17 above the main frame 42 of the apparatus by the uppermost of fans 31 and by the uppermost of drums 38. Thus with an apparatus embodying the present invention, a separate cane topper (such as that described and claimed in British Pat. No. 1,427,930 could be dispensed with.

The cleaned and topped canes are finally guided through fan shrouds 41 and deposited into a bin 36 which travels on wheels 37 and is vertically and horizontally hinged at 87 to the main frame 42 of the apparatus. As shown in FIG. 1c, the lower section 88 of the bin is split into two halves 88a, 88b, each of which can be swung about pivots 89 by hydraulic rams 90 into a position shown in FIG. 1c in phantom outline, to discharge the cane stalks downwardly.

Although the apparatus described is used for gathering and cleaning leafy green unburnt sugar cane, an apparatus embodying the invention could be used to gather, elevate and clean a swath of at least partially flattened sugar cane which has first been burnt to remove most of the leafy material from the sugar cane.

In either case, the apparatus on its propelling vehicle may be passed over the swath of cane in the same direction as that of the cutting apparatus which flattens and severs the cane; although the separation of leaf and cane would then be inferior and it may be necessary to first "top" the canes using, for example, the apparatus of British Pat. No. 1,427,930. In this case, an apparatus embodying the present invention may comprise simply the contra-rotating drums, ground-following supporting means and nip elements. The cane swath would be individually nipped as before and flung rearwardly behind such a machine, and to help the gathering effect the gap 25 would be eliminated and the plate 23 extend forward under the sweeps.

It will be appreciated that in any of the embodiments described above, the rotating sweeps will tend to break off any unsevered cane at its weak base point. They may be deliberately used to do this if the swath of cane has been merely flattened, and not separately severed, by whatever apparatus previously passed over it.

I claim:

1. A method of cleaning and topping a swath of at least partially cut and flattened leafy green sugar cane, comprising passing over the swath of cane an apparatus, mounted on or towed behind a propelling vehicle which performs the successive steps of gathering the swath, lifting it from the ground on which it lies, pulling individual canes top first from the swath, supporting the stalk of each cane as it is pulled from the swath, accelerating the cane rearwardly of the direction of travel of the vehicle, restraining the top of each cane whilst continuing to move the stalk rearwardly to cause the top to break away from the stalk.

2. Apparatus for cleaning and topping a swath at least partially cut and flattened leafy green sugar cane, comprising a frame;
   means for mounting the frame on a propelling vehicle, to be passed in a forward direction over the swath;
   at least one power-driven hub assembly mounted on the frame and rotatable about an axis extending upwardly from the ground along which the vehicle travels;
   a plurality of gathering elements mounted on and extending outwardly from the lower portion of said hub assembly for lifting the swath from the ground on which it lies and moving the lifted cane rearwardly;
   means pivotally connecting the gathering elements to the hub assembly along axes which permit each element to swing up and down relative to the hub assembly to follow the contours along which the vehicle travels;
   means defining a nip, for pulling individual canes top first from the swath, said nip defining means being mounted on the frame rearwardly of the gathering elements, in the direction of travel of the vehicle, and including means for restraining the leafy top of each cane whilst the stalk is pulled through the nip by the nip defining means to cause the top to break away from the stalk; means for generating a forced air draught in a sense to force the leaves of the stalk top against the nip defining means to further restrain the leafy top, said forced air draught generating means being mounted on the frame.

3. Apparatus according to claim 2, wherein resilient restraining means are provided to oppose the up-and-down swinging movement of each gathering element.

4. Apparatus according to claim 3, wherein said resilient restraining means comprise a variably loaded spring means, provided in each pivotal connection between each gathering element.

5. Apparatus according to claim 4, wherein each hub assembly comprises three outwardly extending gathering elements equally spaced round the axis of rotation of the hub assembly.

6. Apparatus according to claim 5, wherein there are provided two hub assemblies, spaced apart across the direction of travel of the vehicle and rotatable in opposite directions to gather the swath between them.

7. Apparatus according to claim 6, wherein the axis of rotation of each said hub assembly is inclined to the vertical in the direction of travel of the vehicle.

8. Apparatus according to claim 7, wherein the path described by the gathering elements of one hub assembly as it rotates overlaps the path described by the gathering elements of the other hub assembly, and the elements of the one hub assembly project into spaces between the elements of the other hub assembly.

9. Apparatus according to claim 8, wherein the gathering elements also constitute a means for lifting the swath from the ground on which it lies.

10. Apparatus according to claim 9, wherein a ramp is mounted on the frame and is disposed rearwardly of the gathering elements in the direction of vehicle travel, the ramp extending across the direction of travel of the vehicle and being inclined downwardly in said direction to constitute a means for supporting the lifted cane.

11. Apparatus according to claim 10, wherein there is provided a gap between the ramp and the arc of rotation of the gathering elements, through which gap leafy material and trash accompanying the swath may fall as the swath travels across the gap, and means being provided to accelerate the cane rearwardly of the direction of travel of the vehicle, said accelerating means being mounted on the frame rearwardly of the ramp in the direction of vehicle travel.

12. Apparatus according to claim 11 wherein a flattening element is mounted on the frame rearwardly of the gap in the direction of vehicle travel, the flattening element extending across the direction of travel of the vehicle for flattening said leafy material and trash therebeneath.

13. Apparatus according to claim 12 wherein the flattening element comprises a rotatable roller.

14. Apparatus according to claim 13 wherein there are provided means to allow the flattening element to move relative to the frame such that it can follow the contours of the ground along which the vehicle travels.

15. Apparatus according to claim 14, wherein the means for accelerating the cane rearwardly comprises a conveying means defining a conveying surface along which the swath travels towards the nip.

16. Apparatus according to claim 15, wherein means for pressing the swath against the conveying surface during its travel therealong are mounted on the frame above the conveying surface.

17. Apparatus according to claim 16 wherein said pressing means comprises at least one rotatable roller pivotally mounted on the frame.

18. Apparatus according to claim 17, wherein the roller is mounted for free rotation on the frame for pressing the swath down against the conveying surface by its own weight.

19. Apparatus according to claim 8, wherein a further ramp is mounted on the frame in the path of travel of the swath between the conveying means and the nip.

20. Apparatus according to claim 19, wherein the further ramp is preceded by a gap, through which gap the leafy material and trash accompanying the swath may fall as the swath is conveyed onto the further ramp.

21. Apparatus according to claim 20 wherein the nip defining means comprises two contra-rotatable elements with corresponding portions of said elements being synchronised to grip individual cane stalks and pull them from the swath, and wherein said corresponding portions of said elements also constitute a means for supporting the cane stalk as it is pulled from the swath.

22. Apparatus according to claim 21 wherein each contra-rotating element comprises a cylindrical drum having a resiliently deformable peripheral surface for frictionally engaging the leafy top to constitute the restraining means.

23. Apparatus according to claim 22 wherein the means for generating a forced-air draught comprises one or more rotary bladed fans.

24. Apparatus according to claim 23, wherein two fans are provided, each mounted on the frame at spaced locations across the exit from the nip with their blades rotatable in opposite senses to create draughts generally opposing and at an angle to the direction of exit from the nip.

25. Apparatus according to claim 24 wherein means for collecting the cane heads after they have been removed from the cane stalks, said means being mounted on the frame adjacent the nip defining means.

26. Apparatus according to claim 25, wherein said collecting means comprise a receptacle into which the cane heads are propelled by the forced-air draught as they are broken from the stalks.

27. Apparatus according to claim 26 wherein there is provided a wheeled bin, means for attaching the wheeled bin to the apparatus so that it can be pulled along the ground on which the swath lies by the propelling vehicle, and into which bin the cleaned cane stalks are deposited.

28. Apparatus according to claim 27, wherein the bin includes means for discharging the cane stalks from either side or both sides.

29. Apparatus according to claim 28 wherein the apparatus further comprises means for mounting the apparatus on the three-point linkage of an agricultural tractor.

* * * * *